3,345,256
PESTICIDAL COMPOSITIONS OF M-ISOPROPYL-PHENYL N-METHYL-N-NITROSOCARBAMATE
Albert H. Haubein, Newark, Del., assignor to Hercules Incorporated, a corporation of Delaware
No Drawing. Filed Sept. 8, 1965, Ser. No. 485,917
5 Claims. (Cl. 167—30)

This invention relates to a new composition of matter. More particularly, it relates to m-isopropylphenyl N-methyl-N-nitrosocarbamate and to its use as a pesticide.

It has been found, in accordance with the present invention, that the instant carbamate, which has the structural formula:

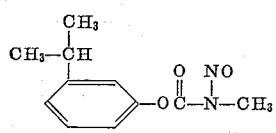

is a new compound which, when dispersed in insecticidal compositions, is highly toxic to a variety of insects contacted therewith and is relatively non-toxic to mammals.

m-Isopropylphenyl N-methyl-N-nitrosocarbamate can be prepared by effecting reaction between m-isopropylphenyl N-methylcarbamate and any of the usual nitrosating agents, such as $N_2O_4$, $N_2O_3$, NOBr, NOCl and alkyl nitrites. The preferred method, however, comprises effecting reaction between m-isopropylphenyl N-methylcarbamate, aqueous sodium nitrite and nitric acid, illustrated by the reaction:

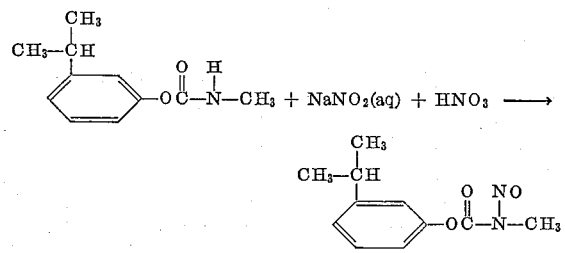

and by the example which follows, in which all parts and percentages specified are by weight.

*Example*

A reaction mixture was formed by adding a solution of 76 parts of sodium nitrite in 100 parts of water to 20 parts of m-isopropylphenyl N-methylcarbamate in 43 parts of ethyl ether. After this mixture was cooled to about 5 to 10° C., a solution of 29 parts of concentrated (69–71%) nitric acid in 60 parts of water was added thereto. This was done during a two-hour period, and at a point below the surface of the sodium nitrite solution. The only agitation of the resulting mixture was that caused by the evolution of liberated gas; it was not stirred. The mixture was held at 10° C. for four hours after the acid solution was added and then allowed to stand at ambient conditions overnight. Thereafter, the ether solution was removed, washed with water, then with sodium bicarbonate (5% aqueous solution), and again with water, and dried over anhydrous sodium sulfate.

Finally, the ether was removed from the dried solution by distillation at room temperature and reduced pressures, which were ultimately brought to 0.5 mm. The distillation residue, 18.9 parts of a yellow oil, analyzed 12.43% N (the theoretical value being 12.15%) and was shown by infrared absorption analysis to contain 7.5% m-isopropylphenyl N-methylcarbamate. Purification of this material was effected by passing seven parts thereof through a chromatographic column containing 79 parts of silica gel, followed by elution with a 95:5 hexane:ether solution, and subsequent removal of the eluant by distillation under the above-described conditions for ether removal. The residue, 5.9 parts of a yellow oil, was substantially pure m-isopropylphenyl N-methyl-N-nitrosocarbamate, containing no more than 2.8% m-isopropylphenyl N-methylcarbamate as determined by infrared absorption analysis.

The m-isopropylphenyl N-methyl-N-nitrosocarbamate, prepared in accordance with the procedure outlined in the foregoing example, was dispersed in water and used in a series of biological tests, which tests demonstrated that this carbamate is toxic to a variety of undesirable pests. The dispersions were prepared by adding to solutions comprised of about equal parts of the carbamate toxicant, benzene, and Tween 20 (a sorbitol monolaurate polyoxyethylene derivative), sufficient quantities of distilled water to result in aqueous dispersions of various toxicant concentrations. A high degree of mortality resulted when a dispersion, used as a spray containing 0.1% of the carbamate, was employed against two-spotted mites. Similarly, in tests for activity against Mexican bean beetles and southern army worms, sprays containing 1% of the toxicant were highly effective. Activity against houseflies was also exhibited by the compound, a good percentage of kill being noted when the spray employed contained 0.5% of the toxicant.

While the preceding information indicates the general pesticidal activity of the subject compound, its most notable utility has been found to be as an insecticide for the control of adult mosquitoes; it is in the use of this carbamate as a mosquitocide against adults of the species that the most beneficial embodiment of the present invention resides.

To be classified as a good adult mosquitocide, a compound should not only demonstrate a high degree of initial toxicity, but also toxicity which persists at a relatively undiminished level for a period of days or preferably weeks. The test method used to demonstrate the outstanding initial and residual toxicity of m-isopropylphenyl N-methyl-N-nitrosocarbamate was as follows:

A dilute aqueous emulsion of the toxicant was pipetted into a non-porous unwaxed paper cup in an amount sufficient to cover the interior surface thereof with either 50 mg. or 25 mg. of toxicant per square foot; which emulsion was spread all over the inner surface until dry. The treated cups were allowed to stand open for three days at ambient conditions of about 78° F. and 50% relative humidity. Ten unfed, 3- or 4-day old, adult, female mosquitoes, anesthetized with $CO_2$, were placed on an 18-mesh stainless steel wire screen and covered with a treated cup, the screen being open to the atmosphere. The mosquitoes revived in a few minutes and were allowed to walk on the walls of the cup for about one hour. They were again anesthetized with $CO_2$ and were placed into clean 5-inch circular cages of 14-mesh stainless steel and given sugar-water for food. The percent dead after 24 hours was then determined. Fresh groups of mosquitoes were placed in the same treated cup at weekly intervals and the toxic effect of each successive exposure was recorded. The weekly exposure was repeated until an appreciable drop in toxicity was noted. The following data were recorded:

ADULT MOSQUITO TEST

| Toxicant Concentration (mg./square foot) | Days (after treatment of cup) | | | | | | |
|---|---|---|---|---|---|---|---|
| | 3 | 10 | 17 | 24 | 31 | 38 | 45 |
| | Degree of Mortality | | | | | | |
| 50 | A | A | A | A | A | B | B |
| 25 | A | A | A | B | C | — | — |

Key: A—Total; B—Good; C—Fair.

Ideally, pesticidal compounds will be relatively harmless to mammals and yet highly toxic to undesirable pests. Acute oral toxicity to white rats is a measure of harm to mammals, such toxicity often being expressed in terms of $LD_{50}$ values. The $LD_{50}$ value assigned to a compound expresses the amount of that compound, in mg. per kg. of body weight, which will be a lethal dose to 50% of the animals tested, a high $LD_{50}$ value indicating a low (favorable) mammalian toxicity since a large dose is required. The instant carbamate has been found to have an $LD_{50}$ value in excess of 400. This value, when compared with the approximate $LD_{50}$ value of 113 exhibited by DDT, shows that the mammalian toxicity of the instant compound is much more favorable than that of DDT, and indicates that this carbamate is highly suitable for use proximate to mammals.

The compound of the present invention may be employed in pesticidal formulations as the sole toxicant thereof. Alternately, properties of this compound may be modified by employing it in admixture with other toxicants such as toxaphene, DDT, Thanite, Chlordane, rotenone, pyrethrum, and the like.

The present carbamate is suitable for application according to any of the methods commonly used for pesticides, for example, as a solvent solution or in combination with solid or liquid extenders or adjuvants. Suitable solvents for the preparation of solvent solutions, which may either be used directly or after dispersion in an immiscible liquid or on a solid carrier, include pine oil, alcohols, hydrocarbon solvents such as xylene, methylated naphthalene, and isophorone, difluorodichloromethane, deodorized kerosene, cyclohexanone, methyl isobutyl ketone and other similar organic solvents. When such a solvent solution is to be used directly, the concentration of toxicant contained therein may range from about 25% to about 90%, based on the weight of the solution. Otherwise, the toxicant concentration in solution will be adjusted so that upon further dilution the desired ultimate concentration results. Amounts of toxicant ranging from about 0.5% to about 10% by weight of the diluted formulation have generally been found to be suitable. An example of an application in which a solvent solution can be used directly is where the toxicant is employed in an aerosol formulation, in which case difluorodichloromethane or a similar aerosol propellant functions both as the solvent and as the propellant vehicle.

In many instances it will be most advantageous, for reasons of economy, facility of application, etc., to employ this pesticide in admixture with solid or non-solvent liquid extenders. Such extenders include water and solid carrier materials, preferably those that are readily available and inexpensive, such as talc, attapulgite, natural clays, pyrophyllite, diatomaceous earth, kaolin, aluminum and magnesium silicates, montmorillonite, and similar substances such as are used as carriers in the insecticide and herbicide arts. Using such solid materials as extenders, wettable powders and dusts may be formulated. In many instances, the extenders envisioned for use in this invention will themselves possess surface-active properties, in which case they may properly be termed dispersants. In other instances, such as when water is used, the extender possesses no surface-active properties of its own, and an additional material will be added to aid in the dispersion of the toxicant throughout the extender. It should be realized that while it is generally advantageous to distribute as uniformly as possible the toxic substances over surfaces to which the pesticides are applied, through the use of surface-active agents when necessary, there may be circumstances under which it is desired to omit such agents; such cases are also intended to be within the scope of this invention. Toxicant concentrations in these extended formulations may vary within wide limits; suitable concentrations for application in the field range from about 0.05% to about 10% of toxicant based on the total weight of formulation.

The aqueous dispersions contemplated herein comprise the compound of this invention, water and a surface-active dispersing agent. Ordinarily, an aqueous dispersion will be made up from a concentrate comprised of the toxic compound and a surface-active agent, which concentrate will subsequently be dispersed in water to a desired concentration. The amount of toxic compound contained in a spray properly diluted for application in the field will generally range from about 0.05% to about 10% of such an aqueous dispersion. In most instances, the amount of surface-active agent used will be from about 1% to about 20% of the amount of toxicant present. Organic solvents may also be contained in the concentrate to aid in effective dispersion.

Suitable surface-active dispersing agents for use in the compositions of this invention are those disclosed in Chemistry of Insecticides, Fungicides, and Herbicides (Donald E. H. Frear, second edition (1948), pages 280–287), for use with known insecticides. They include neutral soaps of resin, alginic, and fatty acids, with alkali metals, alkyl-amines or ammonia; saponins, gelatins, milk, soluble casein, flour and soluble proteins thereof, sulfite lye, lignin pitch, sulfite liquor, long-chain fatty alcohols having 12–18 carbon atoms and alkali metal salts of the sulfates thereof, salts of sulfated fatty acids, salts of sulfonic acids, esters of long-chain fatty acids and polyhydric alcohols in which alcohol groups are free, solid dispersants such as fuller's earth, china clay, kaolin, attapulgite, and bentonite and related hydrated aluminum silicates having the property of forming a colloidal gel. Among the other surface-active dispersing agents which are useful in the compositions of this invention are the omega-substituted polyethylene glycols of relatively long chain length, particularly those in which the omega substituent is aryl, alkyl, or acyl.

Compositions of the toxic material and surface-active dispersing agent will in some instances have more than one surface-active dispersing agent for a particular type of utility. For example, the toxic formulation may contain surface-active clay as the sole adjuvant or clay and another surface-active dispersing agent to augment the dispersing action of the clay. Similarly, as is hereinbefore described, the toxicant may have water admixed therewith along with a surface-active dispersing agent, most often the amount of water added being sufficient to form an emulsion. All of these compositions comprising the toxic compound and surface-active dispersing agents may contain, in addition, synergists and/or adhesive or sticking agents. Moreover, the recital of specific classes of additives is not intended to limit the scope of this invention thereto, but it is to be understood that the addition of other materials to these formulations is also envisioned.

In using the toxicant of this invention for killing pests, the compound acts by contact therewith, which contact may be direct, as by spraying the insects themselves, and/or indirect, as by contacting the habitats of the insects with the m-isopropylphenyl N - methyl-N-nitrosocarbamate.

What I claim and desire to protect by Letters Patent is:
1.

$$\underset{CH_3-CH}{\overset{CH_3}{|}} \diagdown \text{C}_6\text{H}_4 - O - \overset{O}{\underset{||}{C}} - \underset{|}{\overset{NO}{N}} - CH_3$$

2. A pesticidal composition comprising the compound of claim 1 in admixture with a surface-active dispersant.
3. A pesticidal composition comprising the compound of claim 1 dissolved in a solvent therefor.
4. A pesticidal composition comprising a minor amount of the compound of claim 1 and a major amount of water.
5. A pesticidal composition comprising a minor amount of the compound of claim 1 and a major amount of a solid carrier material.

References Cited

UNITED STATES PATENTS 2,978,485  4/1961  Frankel ------------ 260—479
3,009,854  11/1961  Russell ------------ 167—22

FOREIGN PATENTS 232,227  1/1959  Australia.

ALBERT T. MEYERS, *Primary Examiner.*
S. ROSEN, *Examiner.*
S. J. FRIEDMAN, *Assistant Examiner.*